United States Patent [19]

Kitoh et al.

[11] Patent Number: 5,424,930
[45] Date of Patent: Jun. 13, 1995

[54] MEASURING-POINT MEMBER FOR OPTICAL MEASUREMENT

[75] Inventors: Hiroyuki Kitoh; Yoshihide Aoki, both of Nagoya, Japan

[73] Assignee: Sanyo Machine Works, Ltd., Aichi, Japan

[21] Appl. No.: 104,004

[22] Filed: Aug. 10, 1993

[30] Foreign Application Priority Data

Jan. 12, 1993 [JP] Japan .................... 5-003017

[51] Int. Cl.6 .................... F21V 11/08; G01B 11/00
[52] U.S. Cl. .................... 362/362; 362/326; 362/317
[58] Field of Search .............. 362/326, 362, 317, 19; 359/599, 707, 894

[56] References Cited

U.S. PATENT DOCUMENTS 4,114,985  9/1978  Friedman .................... 359/599

FOREIGN PATENT DOCUMENTS 235830  9/1988  Japan .
139408  5/1992  Japan .................... 359/894
73702  9/1992  Japan .................... 359/599

Primary Examiner—James C. Yeung
Assistant Examiner—Sara Raab
Attorney, Agent, or Firm—Nikaido, Marmelstein, Murray & Oram

[57] ABSTRACT

A self-illuminating measurable-point member includes; a light source, a fine through-hole which permits light from the light source to permeate therethrough, and a diffusible member which diffuses light permeating the fine through-hole. Light from the light source is condensed via the fine through-hole and diffused via the diffusible member.

2 Claims, 2 Drawing Sheets

MEASURING-POINT MEMBER FOR OPTICAL MEASUREMENT

FIELD OF THE INVENTION

The present invention relates to a measuring-point member for an optical measurement for use in, but not in an exclusive sense, three-dimensional measurement by means of a plurality of two-dimensional photosensitive elements.

BACKGROUND OF THE INVENTION

Conventionally, as one of practical methods for executing three-dimensional measurement of a measurable object like an automotive body, there is such a method to compute dimensions of a measurable body via triangulation based on image data picked up by a plurality of two-dimensional photosensitive elements like CCD cameras for example.

According to this conventional method, as shown in FIGS. 5 and 6, when light beam from a light-point P, formed at a predetermined position on a measurable object A, is incident upon a light-receptive solid sensor 3 through a lens 2 of each CCD camera 1, among a number of picture elements 4 conjunctionally composing the solid sensor 3, a computer unit detects a specific position from the center of the solid sensor 3 corresponding to the center of the output from a group of picture elements 4 respectively emitting image output in response to the incident light beam, and then, based on the positional data, the computer an computes angle of the light point P emitted from respective CCD cameras 1. The reference character "L" shown in FIG. 6 designates the light axis of each CCD camera 1.

Next, the computer unit computes the position of the light point P based on the angle data transmitted from a plurality of CCD cameras 1.

In this way, any conventional system determines three-dimensional dimensions of a measurable object A by sequentially computing data collected from a number of light points P on the measurable object A.

For example, a laser scanner may be used for composing practical means for forming a number of light points P on a measurable object A by sequentially irradiating the object A with a laser spot beam.

However, in order to execute a three-dimensional measuring process based on the above method, it is essential that an absolute positional relationship of an individual CCD camera 1 against the measurable object A be detected prior to execution of an actual measuring operation.

To achieve this, prior to the execution of a three-dimensional measurement by means of a plurality of CCD cameras 1, initially, a plurality of measuring-point members 10 available for an optical measurement as the basis of the measurement, are installed on the measurable object A or at plural positions in the periphery of the measurable object A. Next, the computer unit computes absolute positions of the respective CCD cameras 1 based on the positions of the respective measuring-point members 10 seen from the respective CCD cameras 1 and also based on the distance between the previously known two points on or in the periphery of the measurable object A.

As shown in FIG. 4, normally, the conventional system uses those measuring-point members 10 which respectively use an LED light source and incorporate a cap lens 13 in the center of the front surface of a cylindrical system 11, where the cap lens 13 protects an LED light emitter 12 and evenly irradiates a front domain of the light emitter 12 by an emitting light beam.

As mentioned above, each of those conventional measuring-point members 10 for an optical measurement incorporates an LED light emitter 12 having a substantial area, and in addition, a cap lens 13 for protecting the LED light emitter 12 is installed around an external periphery of the light emitter 12. Because of this structure, when each of those CCD cameras 1 picks up an image of the individual measuring-point members 10, the LED light emitter 12 itself is identified as a light ball having a substantial area, and yet, whenever varying an angle to the pick up image of respective measuring-point members 10, due to frictional effect of the cap lens 13 disposed in front of the LED light emitter 12, the position of the most luminous domain inside of the light ball is variably seen.

Therefore, whenever optically measuring three-dimensional dimensions of a measurable object A based on high precision by utilizing those measuring-point members 10, both the magnitude and apparent shift of the most luminous domain in the light ball, which adversely affects precision of the measured effect to be lowered is a critical problem to solve.

SUMMARY OF THE INVENTION

Therefore, the invention provides a novel self-illuminating measuring-point member available for executing an optical measurement, which is used for determining three-dimensional dimensions of a measurable object by activating a plurality of two-dimensional photosensitive elements to pick up an image of individual measuring-point members.

The measuring-point member offered by the invention comprises a light source, a diffusible plate which is disposed in front of the light source in order to diffuse light from the light source, and a light-shielding film formed in the front of or on the back of this diffusible plate and having a pin hole formed in the center thereof. Alternatively, the measuring-point member may comprise a light source, a light-shielding plate disposed in front of the light source and having a through-hole formed in the center thereof, and a diffusible member built in the through-hole in order to diffuse light permeating the through-hole.

As described above, a fine through-hole permitting permeation of light from a light source and a diffusible member for diffusing light are respectively disposed in front of the light source. By virtue of the provision of these, a spot light source is formed, for irradiating light containing weak directivity of light intensity, from an extremely fine light spot.

DESCRIPTION OF THE PREFERRED EMBODIMENTS

Figure 1:
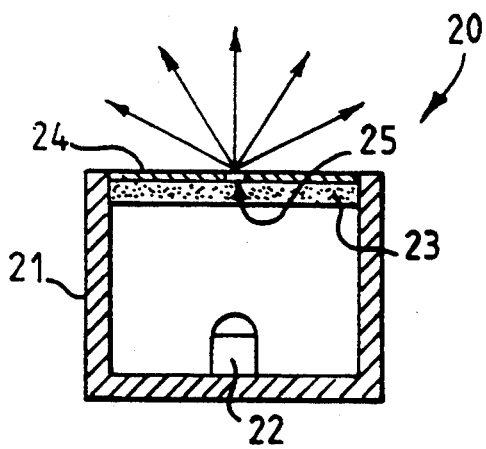
FIG. 1 is a sectional view of a single unit of measuring-point member available for optical measurement according to the first embodiment of the invention.

FIG. 1 schematically illustrates a measuring-point member for an optical measurement according to the first embodiment of the invention. The reference numeral 21 shown in FIG. 1 designates a bottomed cylindrical casing having an aperture in the front. The reference numeral 22 designates a light-emitting diode (hereinafter merely called an LED) which itself makes up a light source being disposed at the center of the internal bottom of the casing 21. The reference numeral 23 designates a diffusible plate which diffuses light emitted from the LED 22 built in the aperture domain of the casing 21. The reference numeral 24 designates a light-shielding film adhered to the front surface of the diffusible plate 23. A pin hole 25 is provided through the center of the light-shielding film 24.

A plurality of measuring-point members 20 respectively having the structure mentioned above are disposed in the periphery of or on a measurable object A. When the built-in LED 22 emits light, light emitted from the LED 22 is diffused by the diffusible plate 23, and then, the diffused light beam permeates the pin hole 25 formed through the light-shielding film 24 before irradiating a front domain of respective measuring-point members 20.

When this condition is entered, the light emitter of each measuring-point member as viewed from each CCD camera 1, functioning as a two-dimensional photosensitive element, takes the form of a pin hole 25 formed in the light-shielding film 24, and therefore, each light emitter becomes an extremely fine spot light source. Light being emitted through the pin hole 25 is diffused by the diffusible plate 23, and in consequence, light containing weak directivity of light intensity is emitted through the pin hole 25.

Therefore, when each CCD camera 1 picks up an image of the measuring-point member 20, the light emitter itself may be identified as an extremely fine spot light source. Furthermore, even when varying the angle for picking up the image of the measuring-point member 20, the apparent position of the light emitter remains invariable. Therefore, the optical measuring system can achieve extremely precise optical measuring effect.

Figure 2:
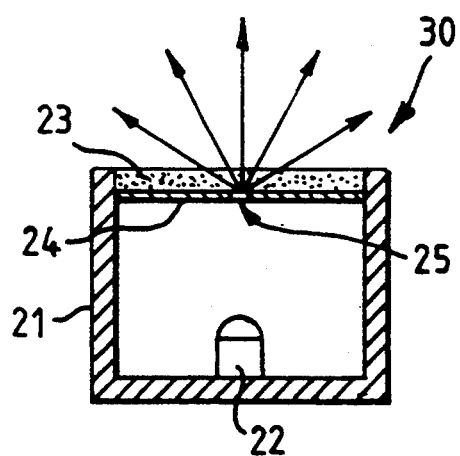
FIG. 2 is a sectional view of a single unit of measuring-point member available for optical measurement according to the second embodiment of the invention.
Figure 4:
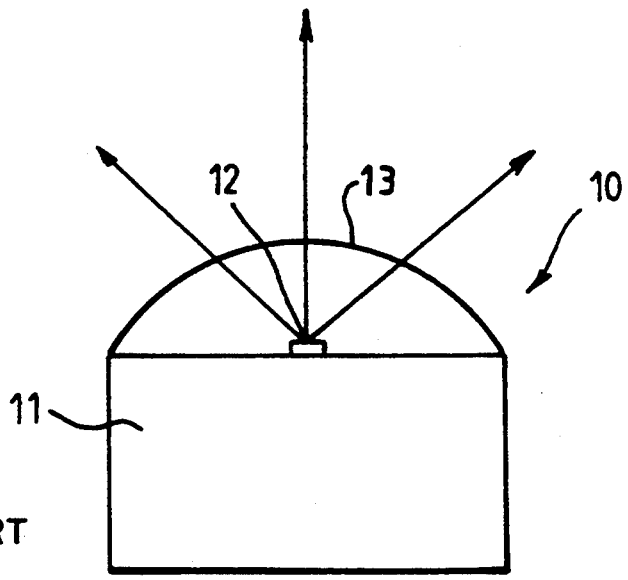
FIG. 4 is a lateral view of a conventional measuring-point member available for optical measurement.
Figure 5:
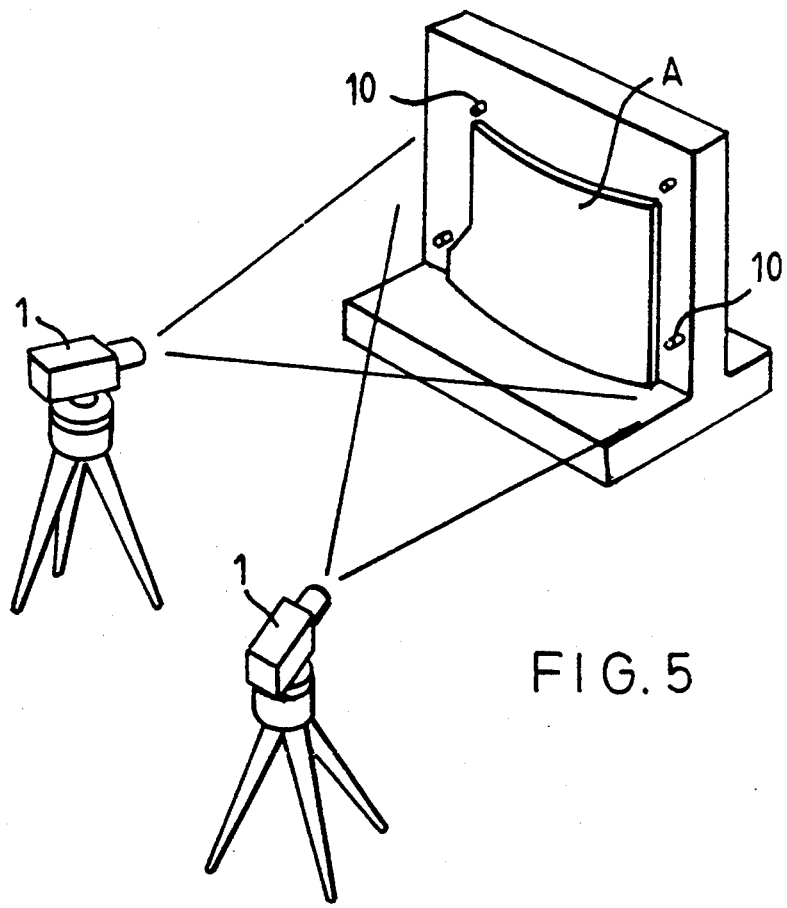
FIG. 5 is a perspective view showing the state of measuring dimension of a measurable object by activating a pair of CCD cameras.
Figure 6:
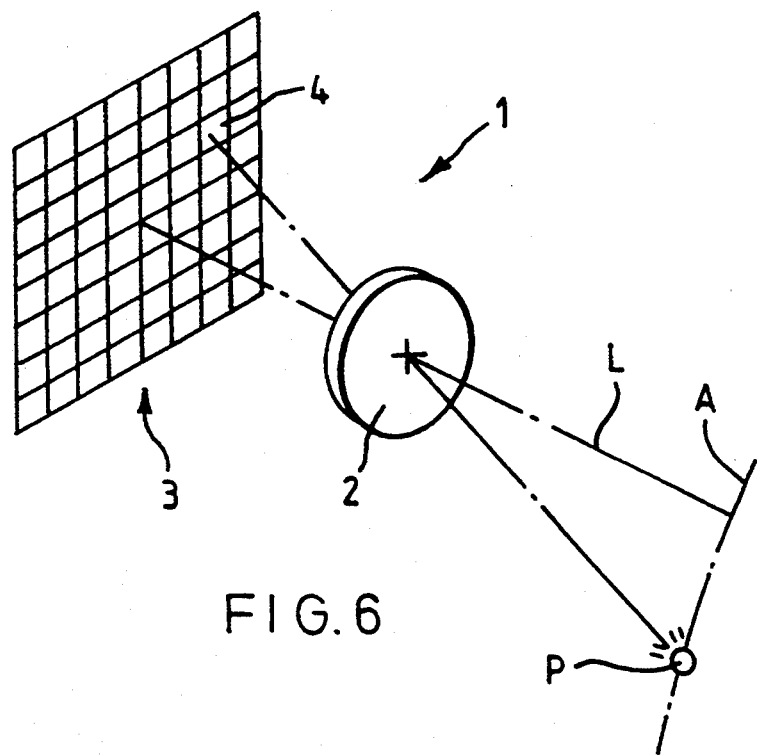
FIG. 6 is a perspective view showing the state in which light beam is incident upon a CCD camera.

FIG. 2 schematically illustrates a measuring-point member for optical measurement according to the second embodiment of the invention.

Like the first embodiment, the measuring-point member 30 shown in FIG. 2 comprises a bottomed cylindrical casing 21, an LED 22 housed in the casing 21, a diffusible plate 23 secured to the opening of the casing 21, and a light-shielding film 24 adhered to the diffusible plate 23 and having a pin hole 25 formed therethrough.

In contrast with the first embodiment in which the light-shielding film 24 having the pin hole 25 is attached to the front surface of the diffusible plate 23, in the second embodiment, the light-shielding film 24 is on the back surface of the diffusible plate 23. Except for this variation, all the details of the second embodiment are exactly identical to the first embodiment.

A plurality of measuring-point members 30 respectively having the structure mentioned above are disposed in the periphery of or on a measurable object A. When the built-in LED 22 emits light, light emitted from the LED 22 permeates the pin hole 25 formed through the light-shielding film 24, and then, while being diffused by the diffusible plate 23, the diffused light beam irradiates the front domain of each measuring-point member 30.

When this condition is entered, the light emitter of each measurable-point member 30 as viewed from each CCD camera 1 takes the form of a pin hole 25 formed in the light-shielding film 24, and therefore, the light emitter becomes an extremely fine spot light source. Then, light emitted through the pin hole 25 is diffused by the diffusible plate 23. In consequence, light emitted through the pin hole 25 irradiates the front domain of respective measuring-point members 30 in the form of light containing weak directivity of light intensity.

Therefore, when each CCD camera 1 picks up the image of each measuring-point member 30, an the light emitter itself can be identified as an extremely fine spot light source. Furthermore, even when varying the angle for picking up image of each measuring-point member 30, apparent position of the light emitter remains invariable, and therefore, the optical measuring system can achieve extremely precise measuring effect.

Figure 3:
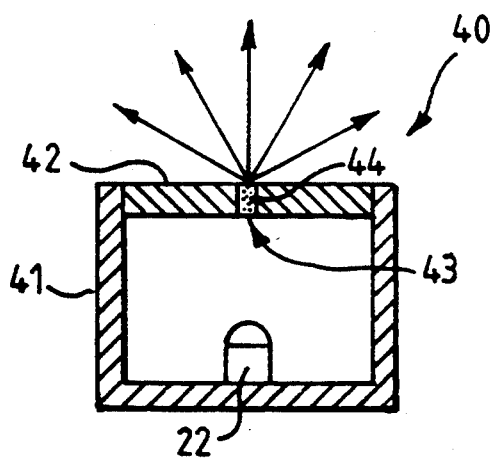
FIG. 3 is a sectional view of a single unit of measuring-point member available for optical measurement according to the third embodiment of the invention.

FIG. 3 schematically illustrates a measuring-point member according to the third embodiment of the invention.

The measuring-point member 40 shown in FIG. 3 comprises a casing 41 which is composed of a bottomed cylindrical body 41, an LED 22 disposed in the center of the bottom of the casing 41, a light-shielding plate 42 secured to the opening of the casing 41 and having an extremely fine through-hole 43 formed in the center thereof, and a diffusible member 44 embedded in the through-hole 43 of the light-shielding plate 42.

A plurality of measuring-point members 40 respectively having the structure mentioned above are disposed in the periphery of or on a measurable object A. When the built-in LED 22 emits light, light emitted from the LED 22 arrives at the through-hole 43 formed through the light-shielding plate 42, and then, while being diffused by the diffusible member 44 built in the through-hole 43, the diffused light irradiates a front domain of each measuring-point member 40.

When this condition is entered, the light emitter of the measuring-point member 40 as viewed from each CCD camera 1 takes the form of a fine through-hole 43 formed in the light-shielding plate 42, and therefore, the light emitter becomes an extremely fine spot light source. Furthermore, since light emitted through the fine through-hole 43 is diffused by the diffusible member 44 built in the fine through-hole 43, diffused light from the through-hole 43 irradiates the front domain of each measuring-point member 40 in the form of light containing weak directivity of light intensity.

Therefore, when each CCD camera 1 picks up an image of the measuring-point member 40, the light emitter itself can be identified as an extremely fine spot light source. Furthermore, even when varying the angle for picking up the image of each measuring-point member 40, the apparent position of the light emitter remains invariable, and therefore, the optical measuring system can achieve an extremely precise optical measuring effect.

The above description related to the embodiments of the invention has solely referred to an example of disposing an LED 22 inside of casings 21 and 41. However, it is also possible for each embodiment of the invention to provide a plurality of LEDs 22 inside of the casings 21 and 41 in the event that a short amount of light is emitted through the pin hole 25 or the through-hole 43.

As is clear from the above description, the invention provides a self-illuminating measuring-point member available for optical measurement, which is used for determining three-dimensional dimensions of a measurable object upon activating a plurality of CCD cameras to pick up an image of the measurable object.

The measuring-point member according to the invention comprises an LED, a fine through-hole which permits light from the LED to pass therethrough, and a diffusible member which diffuses light permeating the fine through-hole.

The optical measuring system utilizing the measuring-point member according to the invention condenses light from an LED through an extremely fine through-hole and diffuses light by means of a diffusible member. In consequence, the optical measuring system of the invention can form an extremely fine spot light source capable of emitting light containing weak directivity of light intensity from an extremely fine light point available for optical measurement. Therefore, the optical measuring system can implement three-dimensional measurement with unsurpassed precision in the course of measuring three-dimensional dimension of a measurable object by means of a plurality of measuring-point members available for optical measurement.

What is claimed is:

1. A measuring-point member available for executing an optical measurement, where said measuring-point member illuminates itself and a plurality of measuring-point members are used for determining three-dimensional dimensions of a measurable object upon activating a plurality of two-dimensional photosensitive elements to pick up an image of said measurable object, wherein, each said measuring-point member comprising:
   a casing having an aperture;
   a light source located in said casing;
   a diffusible plate located in said aperture and disposed in front of said light source in order to diffuse light from said light source; and
   a light-shielding film formed one of a) in a front of said diffusible plate and b) on a back of said diffusible plate and said light-shielding film having a pin hole formed in a center thereof.

2. A measuring-point member available for executing an optical measurement, wherein said measuring-point member illuminates itself and a plurality of measuring-point members are used for determining three-dimensional dimensions of a measurable object upon activating a plurality of two-dimensional photosensitive elements to pick up an image of said measuring-point member, where each said measuring-point member comprising:
   a casing having an aperture;
   a light source disposed in said casing;
   a light-shielding plate located in said aperture and disposed in front of said light source and said light-shielding plate having a through-hole in a center thereof; and
   a diffusible member which is built in said through-hole in order to diffuse light permeating said through-hole.

* * * * *